US006975487B2

(12) United States Patent
Ueda et al.

(10) Patent No.: US 6,975,487 B2
(45) Date of Patent: Dec. 13, 2005

(54) MAGNETIC HEAD HAVING PADS PROVIDED ON THE MEDIUM-FACING SURFACE FOR MINIMIZING INFLUENCES OF AIR CHANGES AND MAGNETIC RECORDING APPARATUS PROVIDED WITH THE SAME

(75) Inventors: Junsei Ueda, Niigata-ken (JP); Yasuyuki Kondo, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 86 days.

(21) Appl. No.: 10/422,563

(22) Filed: Apr. 23, 2003

(65) Prior Publication Data

US 2003/0206374 A1 Nov. 6, 2003

(30) Foreign Application Priority Data

May 1, 2002 (JP) ............................ 2002-129989

(51) Int. Cl.[7] .................................................. G11B 5/60
(52) U.S. Cl. ...................................................... 360/237
(58) Field of Search ......................................... 360/237

(56) References Cited

U.S. PATENT DOCUMENTS

| | | | | |
|---|---|---|---|---|
| 5,267,104 | A | 11/1993 | Albrecht et al. | |
| 5,267,109 | A | 11/1993 | Chapin et al. | |
| 5,285,337 | A | 2/1994 | Best et al. | |
| 5,499,149 | A | 3/1996 | Dovek | |
| 6,057,983 | A | 5/2000 | Kajitani | |
| 6,125,005 | A * | 9/2000 | Lee et al. | 360/236.1 |
| 6,212,032 | B1 | 4/2001 | Park et al. | |
| 6,349,018 | B2 | 2/2002 | Koishi et al. | |
| 6,351,345 | B1 | 2/2002 | Kameyama | |

FOREIGN PATENT DOCUMENTS

| | | |
|---|---|---|
| JP | 09-115259 | 5/1997 |
| JP | 10-255425 | 9/1998 |
| JP | 2002/032905 | 1/2002 |
| JP | 95411 A1 | 11/2004 |

* cited by examiner

*Primary Examiner*—A. J. Heinz
(74) *Attorney, Agent, or Firm*—Brinks Hofer Gilson & Lione

(57) ABSTRACT

In a magnetic head, a center pad provided with a magnetic core is formed at the center of an edge at a trailing side of the recording medium opposing surface of a slider body. Two side pads are formed at both ends in the direction of the width at positions closer to a leading side than the center pad is located. A total value of the areas of the recording medium opposing surfaces of the two side pads is set to be larger than a value of the area of the recording medium opposing surface of the center pad. Each of the side pads has, at the leading side, a front stepped surface that is lower than the remaining portion.

7 Claims, 7 Drawing Sheets

MAGNETIC HEAD HAVING PADS PROVIDED ON THE MEDIUM-FACING SURFACE FOR MINIMIZING INFLUENCES OF AIR CHANGES AND MAGNETIC RECORDING APPARATUS PROVIDED WITH THE SAME

BACKGROUND OF THE INVENTION

1. Field of the Invention

The present invention relates to a magnetic head and a magnetic recording apparatus provided with the same.

2. Description of the Related Art

Hitherto, a magnetic recording apparatus has been known as one type of information recording equipment for a personal computer or the like.

The magnetic recording apparatus has a plurality of discoid magnetic disks rotatably provided on a chassis, and magnetic heads provided on the front side or the back side of the magnetic disks such that they are free to relatively move with respect to the magnetic disks (magnetic recording mediums). These magnetic heads are respectively supported by bases through the intermediary of long and narrow load beams shaped like triangular plates and arms, the bases being rotatably supported on the chassis. In such a magnetic recording apparatus, as the bases rotate angularly about a rotating shaft, the magnetic head relatively moves in the radial direction with respect to the magnetic disk so as to read magnetic information at a desired position on a magnetic disk or to write magnetic information at a desired position on a magnetic disk.

FIG. 9 is a perspective view showing a contact start stop (CSS) type magnetic head having its recording medium opposing surface facing upward. FIG. 10 is a plan view showing the magnetic head observed from its recording medium opposing surface.

A magnetic head 102 is primarily constructed of a plate-like slider body 111 formed of a nonmagnetic material and a magnetic core 112 that is provided on one end portion of the slider body 111 and has a coil.

In the slider body 111 of the magnetic head 102, the side opposite from the side where the coil is provided is defined as a leading side 113 on the upstream end in the rotational direction of a magnetic recording medium. The side where the coil is provided is defined as a trailing side 115 on the downstream end in the rotational direction of the magnetic recording medium.

A center pad 125 is formed at the center of the width of the trailing side 115 of the slider body 111, the magnetic core 112 being embedded in the center pad 125. Side pads 126 are individually formed on both ends of the trailing side 115 of the slider body 111 such that they are located on both sides of the center pad 125. In the conventional magnetic head 102, an amount of lift is controlled primarily by means of the center pad 125. For this reason, the center pad 125 is formed such that its surface facing the recording medium has a larger area than that of either of the side pads 126. The side pads 126 and 126 are auxiliary pads for the center pad 125, and restrain teetering in the rolling direction or in the direction of the width of the slider body.

The center pad 125 further has a first rear pneumatic bearing surface 125*a* in which the magnetic core 112 is embedded, and a front stepped surface 125*b* formed to be lower than the first rear pneumatic bearing surface 125*a*. The provision of the front stepped surface 125*b* allows an airflow to smoothly run from the front stepped surface 125*b* to the first rear pneumatic bearing surface 125*a* via a front wall surface 125*c* while the magnetic recording medium is rotating. Thus, the airflow acts on the first rear pneumatic bearing surface 125*a* to produce a high positive pressure on the first rear pneumatic bearing surface 125*a*.

Each side pad 126 has a second rear pneumatic bearing surface 126*a* and a front stepped surface 126*b* formed to be lower than the second rear pneumatic bearing surface 126*a*.

A center rail 121 is formed on the end of the leading side 113 of the slider body 111. The slider body 111 further has side rails 122 and 123 extending from both ends of the center rail 121 toward the trailing side 115. The center rail 121 has a front pneumatic bearing surface 121*a*, a front stepped surface 121*b* formed to be lower than the front pneumatic bearing surface 121*a*, and a side stepped surface 121*c* extending from both ends of the front stepped surface 121*b* toward the trailing side 115. Side rails 122 and 123 are flush with the front pneumatic bearing surface 121*a* of the center rail 121. The front pneumatic bearing surface 121*a* of the center rail 121, the first rear pneumatic bearing surface 125*a* of the center pad 125 and the second rear pneumatic bearing surfaces 126*a* of the side pads 126 are all flush. A pair of anti-adhesion pads 129 formed to be taller than the front pneumatic bearing surface 121*a* is provided on both sides of the front stepped surface 121*b*. Furthermore, a pair of anti-adhesion pads 130 that is taller than the front pneumatic bearing surface 121*a* is formed on the side stepped surfaces 121*c*.

A plurality of pairs of anti-adhesion pads 131, that are taller than the side rails 122 and 123, is provided on a recording medium opposing surface 111*a* between side rails 122 and 123.

In the magnetic head 102 having the construction described above, as shown in FIG. 11, when an airflow A is generated as a magnetic recording medium 100 rotates, the airflow A moves from the leading side 113 to the recording medium opposing surface of the slider body 111 and acts on the front pneumatic bearing surface 121*a* of the center rail 121. This causes the front pneumatic bearing surface 121*a* to be subjected to a positive pressure. The airflow A further acts on the second rear pneumatic bearing surfaces 126*a*, 126*a* of the side pads 126, 126, and the first rear pneumatic bearing surface 125*a* of the center pad 125, causing the first rear pneumatic bearing surface 125*a* and the second rear pneumatic bearing surfaces 126*a*, 126*a* to be subjected to a positive pressure. This allows the slider body 111 to levitate from the front or back surface of the magnetic recording medium 100 and fly so as to read magnetic information from the magnetic recording medium 100 or write magnetic information into the magnetic recording medium 100 by the magnetic core 112 while it is flying. Reference character B in FIG. 11 denotes the direction in which the magnetic recording medium 100 rotates.

In the conventional magnetic head 102, however, the amount of lift of the slider body 111 diminishes with a drop in air pressure, as illustrated by the two-dot chain line in FIG. 11, and spacing H between the magnetic core 112 and the magnetic recording medium 100 diminishes accordingly. This has been posing a problem in that the magnetic core 112 may come in contact with the magnetic recording medium 100, causing the magnetic core 112 to deteriorate. Especially in the case of the magnetic head 102 having the structure shown in FIGS. 9 and 10, the positive pressure applied to the center pad 125 in which the magnetic core 112 is embedded is the highest, and hence the center pad 125 is most likely to be subjected to changes in air pressure. This problem is apt to occur when the number of revolutions of the magnetic recording medium 100 changes or an impact or load is applied from outside during a loading operation in which the magnetic head 102 is brought closely to the magnetic recording medium 100 and then levitated or during a seeking operation in which the magnetic head 102 is moved beyond the magnetic recording medium 100.

SUMMARY OF THE INVENTION

The present invention has been made with a view toward solving the problems described above, and it is an object of the present invention to provide a magnetic head capable of preventing a magnetic core from coming in contact with a magnetic recording medium by minimizing the influences of air pressure changes exerted on the spacing between the magnetic core and the magnetic recording medium when a slider body of the magnetic head flies with respect to the magnetic recording medium.

To this end, a magnetic head in accordance with the present invention has a magnetic head slider including a slider body that flies with its recording medium opposing surface facing a magnetic recording medium rotatively driven, and a magnetic core for recording or reproducing magnetic information being provided on the recording medium opposing surface of the slider body; a center pad, side pads, a center rail and side rails for levitating the slider body being provided on a recording medium opposing surface of the slider body; and the upstream side in the rotational direction of the magnetic recording medium being defined as a leading side, while the downstream side in the rotational direction being defined as a trailing side in the slider body, wherein the magnetic core is provided on the center pad, the center pad is formed at the center of an end portion on the trailing side of the recording medium opposing surface of the slider body, the side pads are formed at both ends in the width direction at the positions closer to the leading side than the center pad is, the total value of the areas of the recording medium opposing surfaces of both side pads is larger than the area of the recording medium opposing surface of the center pad, and each of the side pads has, at least on the leading side, a front stepped surface that is lower than the remaining portion of the side pad.

In the magnetic head having the construction described above, a highest positive pressure produced by an airflow as the magnetic recording medium rotates is applied to the vicinity of the side pads. Hence, when air pressure drops due to a shock or load applied from outside at loading or seeking, the amount of lift diminishes and the side pads, being the air support points, are subjected most to the influences of changes in air pressure. Thus, the center pad equipped with the magnetic core does not shoulder as much of air pressure changes as do the side pads. This makes it possible to minimize the influences of air pressure changes on the spacing between the magnetic core and the magnetic recording medium, thereby preventing the magnetic core from coming in contact with the magnetic recording medium.

The differences between the operation of the magnetic head in accordance with the present invention and the conventional magnetic head will now be described.

In the conventional magnetic head shown in FIGS. 9 and 10, the center pad is formed to be larger than the side pads, and the center pad has its front stepped surface formed on the leading side. Hence, the surface of the center pad that opposes a recording medium, that is, a first rear pneumatic bearing surface, is subjected to a positive pressure that is higher than that applied to the surfaces of the side pads that oppose the recording medium, that is, second rear pneumatic bearing surfaces.

In the magnetic head according to the present invention, the total value of the areas of the surfaces of both side pads that oppose a recording medium is set to be larger than the area of the surface of the center pad that opposes the recording medium. Hence, influences by an airflow exerted on the recording medium opposing surface, i.e., the first rear pneumatic bearing surface, of the center pad are smaller than those exerted on the side pads. As a result, the positive pressure applied to the recording medium opposing surface of the center pad is reduced, while the recording medium opposing surfaces of both side pads are subjected to more influences exerted by an airflow than those exerted on the center pad. In addition, since the center pad has the front stepped surface on the leading side, the airflow smoothly runs from the front stepped surface to the recording medium opposing surface, i.e., the second rear pneumatic bearing surfaces, causing a higher positive pressure, that is, a lift, to be generated on the recording medium opposing surfaces.

Preferably, the center pad has no step in a side surface at least on the leading side. With this arrangement, the side surface at the leading side of the center pad is formed like a steep wall surface, so that an airflow moves along the steep wall surface. Hence, the action attributable to the airflow applied to the recording medium opposing surface, i.e., the first rear pneumatic bearing surface, of the center pad is reduced, and the positive pressure applied to the recording medium opposing surface of the center pad is accordingly lower.

Alternatively, the area of the recording medium opposing surface of at least one of the two side pads may be set to be larger than the area of the recording medium opposing surface of the center pad.

Preferably, if the longitudinal distance, i.e. distance along the slider length $L_1$, between the magnetic core provided in the center pad and the trailer side ends of the side pads is denoted as $L_2$, then a condition expressed by $0\ \mu m < L_2 \leqq 150\ \mu m$ is satisfied in order to minimize the influences caused by changes in air pressure exerted on the spacing between the magnetic core and a magnetic recording medium. Further preferably, a condition expressed by $50\ \mu m \leqq L_2 \leqq 100\ \mu m$ is satisfied in order to ensure minimized influences caused by changes in the number of revolutions of the magnetic recording medium exerted on the spacing between the magnetic core and the magnetic recording medium, in addition to the aforesaid advantage.

A magnetic recording apparatus in accordance with the present invention has the magnetic head in accordance with the present invention that has one of the above constructions, a magnetic recording medium that is rotatively driven, a supporting device for moving the magnetic head in the radial direction of the magnetic recording medium, and a magnetic head retreating portion provided at an outer peripheral side or an inner peripheral side of the magnetic recording medium.

The magnetic recording apparatus equipped with the magnetic head in accordance with the present invention is capable of preventing the magnetic core provided in the magnetic head from damages caused by the magnetic core coming in contact with the magnetic recording medium. Moreover, even if a shock or load should be applied from outside, the magnetic recording medium can be protected from damage caused by the magnetic head while flying.

DESCRIPTION OF THE PREFERRED EMBODIMENTS

An embodiment in accordance with the present invention will now be described with reference to the accompanying drawings. The present invention, however, is not limited to the following embodiment.

Figure 1:
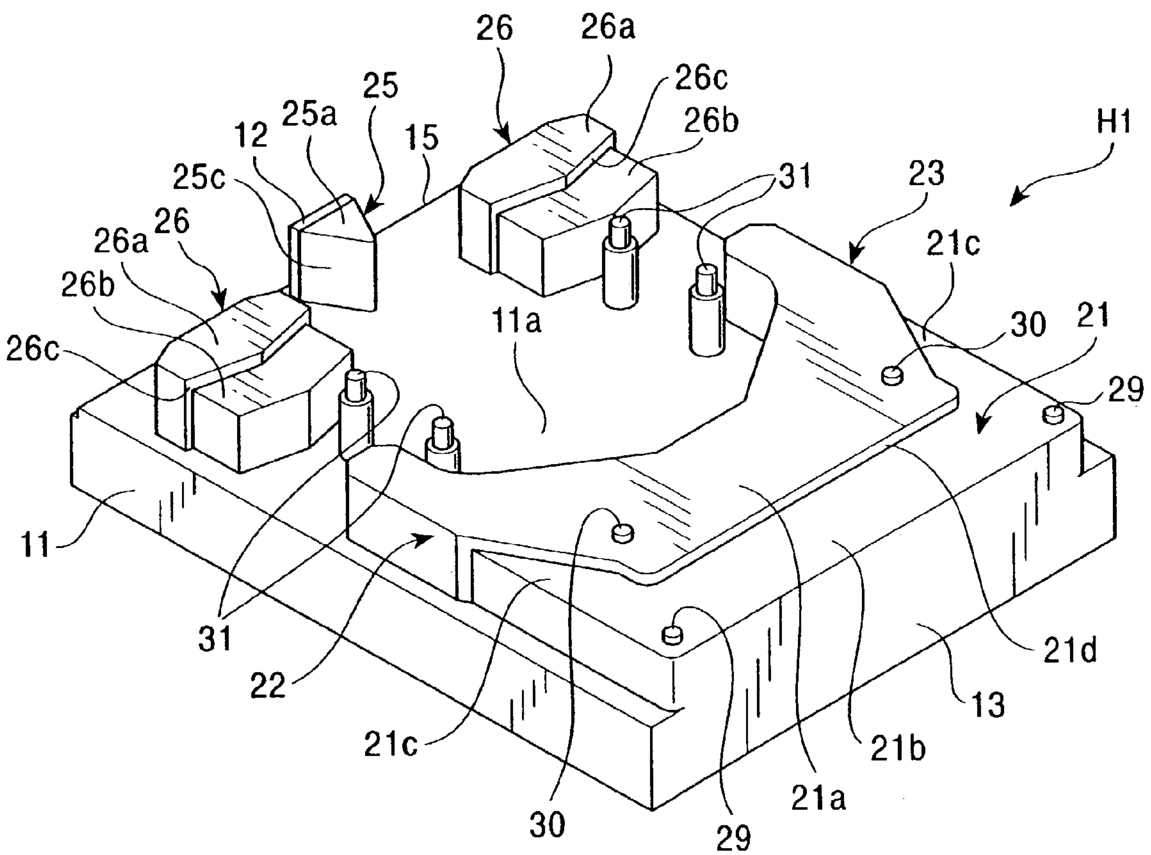
FIG. 1 is a perspective view showing a magnetic head according to an embodiment of the present invention, the recording medium opposing surface thereof facing upward.
Figure 2:
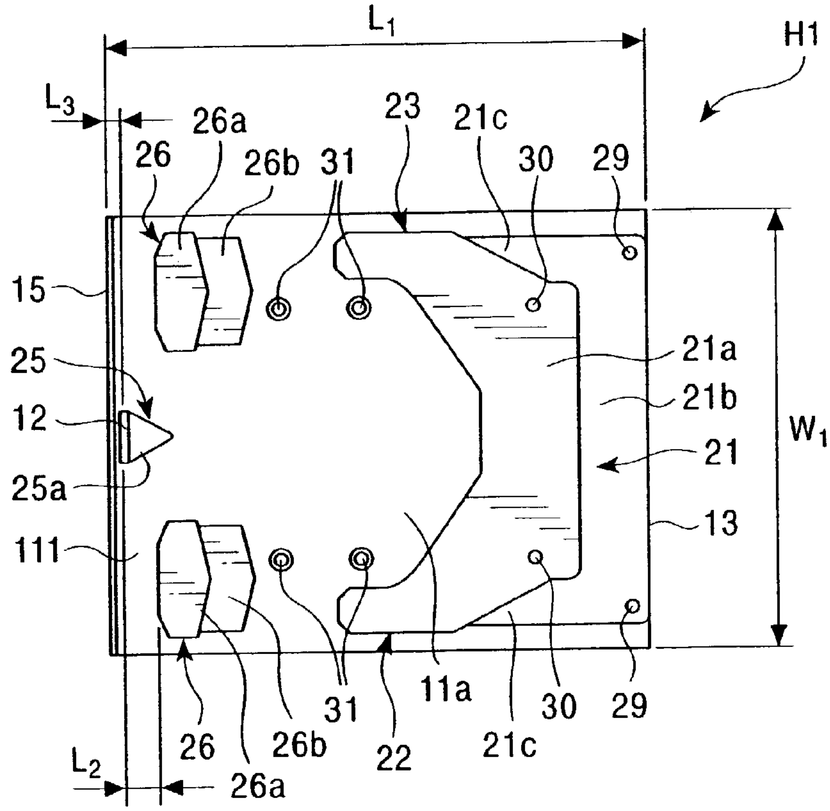
FIG. 2 is a plan view of the magnetic head shown in FIG. 1 observed from the recording medium opposing surface side.

FIG. 1 is a perspective view showing an embodiment in which the magnetic head according to the present invention has been applied to a contact start stop (CSS) type or a load/unload (L/UL) type magnetic head. FIG. 2 is a plan view of the magnetic head observed from a recording medium opposing surface side. Magnetic heads H1 according to the embodiment are used in the L/UL type magnetic recording apparatus shown in FIG. 4.

Figure 4:
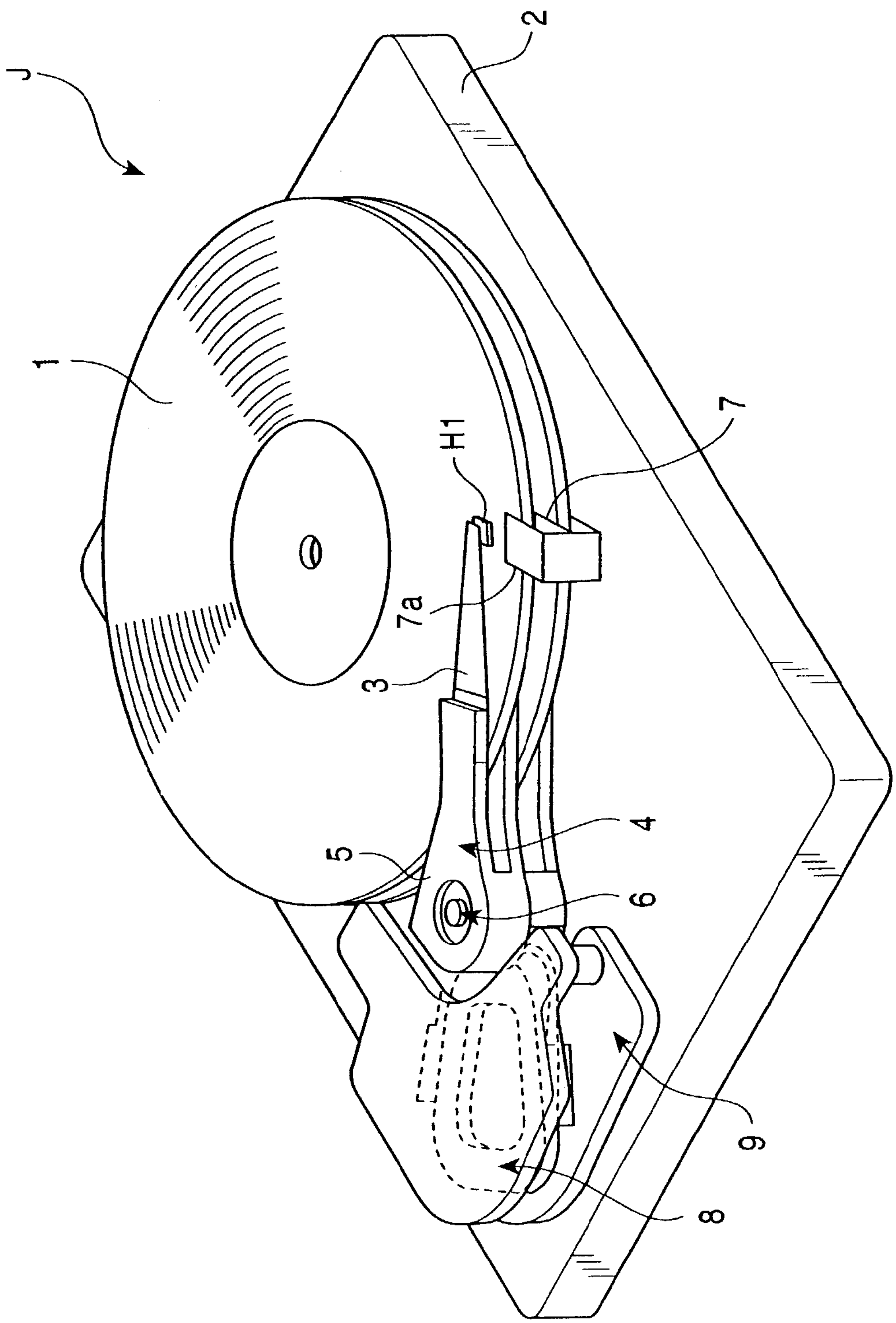
FIG. 4 is a perspective view showing an example of a magnetic recording apparatus equipped with the magnetic head according to the present invention.

A magnetic recording apparatus J shown in FIG. 4 is provided with a plurality of (two in the drawing) discoid magnetic disks (magnetic recording media) 1 that have magnetic films applied thereto and are rotatably provided on a chassis 2. The magnetic heads H1 are provided on the front or back side of the magnetic disks 1 so that it can be relatively moved with respect to the magnetic disks 1. The plural magnetic heads H1 are individually supported by bases 5 through the intermediary of load beams 3 shaped like long and narrow triangular plates and arms 4 and also through the intermediary of mounting boards called flexures (not shown). The bases 5 are supported on the chassis 2 such that they are free to rotate angularly about a rotating shaft 6.

Above the upper surface of the chassis 2, the two magnetic disks 1 are stacked with a predetermined vertical gap provided therebetween, and are rotatably supported about a rotating shaft penetrating the centers of the magnetic disks 1. A flat spindle motor (not shown) is provided at the bottom side of the rotating shaft at the centers of the magnetic disks 1. The spindle motor rotatively drives the magnetic disks 1.

In actual operation, a covering member (not shown) is provided such that it is in close contact with the upper surface of the magnetic recording apparatus J shown in FIG. 4 so as to provide the chassis 2 with a closed structure that allows air to move in and out through a filter. FIG. 4, however, shows only the internal construction of the magnetic recording apparatus J, omitting the covering member. Magnetic layers are provided on the front and back surfaces of the magnetic disks 1, and numerous tracks having extremely small widths are formed in the circumferential direction in the magnetic layers. The magnetic heads H1 freely move in the radial direction of the magnetic disks 1 so as to access target tracks.

More specifically, in the structure shown in FIG. 4, as the bases 5 circularly move, the magnetic heads H1 relatively move in the radial direction with respect to the magnetic disks 1 so as to read magnetic information at a desired position on the magnetic disks 1 or write magnetic information at a desired position on the magnetic disks 1.

In the supporting structure of the bases 5 shown in FIG. 4, the bases 5 rotate angularly about a rotating shaft 6 disposed vertically in parallel to the rotating shaft of the magnetic disks 1, and the magnetic heads H1 move above (or under) the magnetic disks 1 to a predetermined position in the radial direction, thus accomplishing the travel of the magnetic heads H1. Furthermore, according to the motor drive structure of the bases 5 shown in FIG. 4, a voice coil 8 and a magnet 9 are combined to provide a voice coil motor structure that allows the magnetic heads H1 to make a micro travel.

A retreating portion 7 is provided beside the outermost periphery (i.e. outer diameter) of the magnetic disks 1 at which the magnetic heads H1 reach as the arms 4 rotate angularly. The retreating portion 7 has supporting plates **7*a* facing the upper or lower surfaces of the magnetic disks 1. When the magnetic disks 1 stop rotating, the magnetic heads H1 move along the slopes formed on the surfaces of the supporting plates 7*a* that face the magnetic recording media so as to rest on the supporting plates 7*a***.

The construction of the magnetic heads H1 according to the embodiment will now be described in more detail. FIG. 1 shows the magnetic head H1 with its bottom surface or the recording medium opposing surface facing upward. The magnetic head H1 is constructed primarily of a plate-shaped slider body 11 made of a hard nonmagnetic ceramic material, such as $Al_2O_3$—TiC, and a magnetic core 12 that is provided on one end of the slider body 11 and has a coil.

In the slider body 11 of the magnetic head H1, the end side opposite from the end where the coil is provided is defined as a leading side 13 on the upstream end in the rotational direction of the magnetic disks 1, while one end where the coil is provided is defined as a trailing side 15 on the downstream end in the rotational direction of the magnetic disks 1.

The magnetic core 12 is provided with an MR head or reading head and an inductive head or writing head laminated in this order on the trailing side.

A center pad 25 substantially shaped like a triangular prism is formed at the center of the end portion of the trailing side 15 (at the center of the width at the trailing side) of the slider body 11. A side surface or wall surface 25*c* of the center pad 25 at the leading side has no step. The surface of the center pad 25 that opposes a recording medium provides a first rear pneumatic bearing surface 25*a*, the above magnetic core 12 being embedded in the first rear pneumatic bearing surface 25*a*.

Side pads 26 shaped like a polygonal prism are independently formed at both ends in the width direction, and are closer to the leading side than the center pad 25 is. Each side pad 26 has a second rear pneumatic bearing surface 26*a* and a front stepped surface 26*b* provided on the leading side in relation to the surface 26*a*. The front stepped surface 26*b* is formed to be lower than the second rear pneumatic bearing surface 26*a*. The second rear pneumatic bearing surface 26*a* and the first rear pneumatic bearing surface 25*a* are flush with each other.

The total value of the areas of the surfaces of the side pads 26 and 26 that oppose a recording medium (the total value of the areas of the two second rear pneumatic bearing surfaces 26*a*) is set to be larger than the value of the area of the first rear pneumatic bearing surface 25*a* of the center pad 25.

Especially in this embodiment, the area of the surface of each side pad 26 that opposes the recording medium, namely, the area of the second rear pneumatic bearing surface 26*a*, is set to be larger than the area of the first rear pneumatic bearing surface 25*a* of the center pad 25.

In the magnetic head H1 according to the embodiment, as shown in FIG. 2, if the longitudinal distance between the center of the magnetic core 12 provided at the center pad 25 (the surface of the reading head at the trailing side) and the trailer side of the side pads 26 is denoted as $L_2$, then the center pad 25 and the side pads 26 are preferably formed to satisfy the condition expressed by $0\ \mu m < L_2 \leqq 150\ \mu m$ is satisfied. If the distance $L_2$ is out of the above range, then spacing H between a magnetic core and a magnetic disk becomes too small when air pressure drops, leading to a danger in that the magnetic core comes in contact with the magnetic disk that may result in serious damages.

Further preferably, the distance $L_2$ satisfies the condition expressed by $50\ \mu m \leqq L_2 \leqq 100\ \mu m$. When the distance $L_2$ lies within the range, the influences caused by a change in air pressure on the spacing H between the magnetic core 12 and the magnetic disk 1 can be further reduced. In addition, the influences of a change in the number of revolutions of the magnetic disk on the spacing H between the magnetic core 12 and the magnetic disk 1 can be reduced. Thus, the effect for restraining the deterioration of the magnetic core 12 can be further improved.

A center rail 21 extending in the direction of width $W_1$ is formed at an edge on the leading side 13 of the slider body 11. The slider body 11 also has side rails 22 and 23 extending from both ends of the center rail 21 toward the trailing side 15.

The center rail 21 has a front pneumatic bearing surface 21*a*, a front stepped surface 21*b* and side stepped surfaces 21*c* extending from both ends of the front stepped surface 21*b* toward the trailing side 15. The front stepped surface 21*b* is formed to be lower than the front pneumatic bearing surface 21*a*, while the front stepped surface 21*b* and the side stepped surfaces 21*c* are formed to be flush with each other.

The heights of the side rails 22 and 23 are set to be the same as that of the front pneumatic bearing surface 21*a* of the center rail 21. In other words, the side rails 22 and 23 are flush with the front pneumatic bearing surface 21*a*. Moreover, the front pneumatic bearing surface 21*a* of the center rail 21, the side rails 22 and 23, the first rear pneumatic bearing surface 25*a* of the center pad 25, and the second rear pneumatic bearing surfaces 26*a* of the side pads 26 are all set to have the same height.

A pair of anti-adhesion pads 29 that is taller than the front pneumatic bearing surface 21*a* is formed at both ends in the direction of the width $W_1$ of the front stepped surface 21*b*. The anti-adhesion pads 29 are provided to prevent the front stepped surface 21*b* from coming in contact with a disk surface when the slider body 11 reaches the disk surface.

Another pair of anti-adhesion pads 30 that is taller than the front pneumatic bearing surface 21*a* is formed at both ends in the direction of the width $W_1$ of the front pneumatic bearing surface 21*a*. The anti-adhesion pads 30 are provided to prevent the front pneumatic bearing surface 21*a* from coming in contact with a disk surface when the slider body 11 reaches the disk surface.

A plurality of pairs (two pairs in the drawing) of anti-adhesion pads 31 that are taller than the side rails 22 and 23 is formed on a recording medium opposing surface 11*a* between the side rails 22 and 23. The anti-adhesion pads 31 are provided to prevent the side rail 22 or 23, the second rear pneumatic bearing surface 26*a*, or the first rear pneumatic bearing surface 25*a* from touching a disk surface when the slider body 11 lands on the disk surface.

In the magnetic head H1 having the construction described above, as shown in FIG. 3, when an airflow A is produced as a magnetic recording medium 100 rotates, the airflow A moves from the leading side 13 to the recording medium opposing surface of the slider body 11. The airflow A further runs from the front stepped surface 21*b* of the center rail 21 and passes the front wall surface (side surface) 21*d* to act on the front pneumatic bearing surface 21*a*. This causes the front pneumatic bearing surface 21*a* to be subjected to a positive pressure, and a lift is generated. The side rails 22 and 23 prevent an airflow detouring the center rail 21 along both sides in the width direction from entering into the rear side of the center rail 21. The moment the airflow A running along the front pneumatic bearing surface 21*a* passes the center rail 21, it spreads in the direction perpendicular to the surface of the magnetic disk, causing a negative pressure to be produced. The negative pressure balances with the lift, thereby restricting the amount of the lift of the slider body.

The airflow A moves from the front stepped surfaces 26*b* and 26*b* of the side pads 26 and 26 to the front wall surface (side surface) 26*c* and acts on the second rear pneumatic bearing surfaces 26*a* and 26*a*. The airflow A acts on the first rear pneumatic bearing surface 25*a* of the center pad 25. As described above, however, the total value of the areas of the recording medium opposing surfaces of the side pads 26 and 26 (the second rear pneumatic bearing surfaces 26*a* and 26*a*) is set to be larger than the area of the first rear pneumatic bearing surface 25*a* of the center pad 25. Hence, the influences exerted by the airflow A on the first rear pneumatic bearing surface 25*a* of the center pad 25 will be smaller than those exerted on the side pads 26. The positive pressure applied to the first rear pneumatic bearing surface 25*a* of the center pad 25, therefore, will be smaller.

Meanwhile, the second rear pneumatic bearing surfaces 26*a* and 26*a* of the side pads 26 and 26 are subjected to more influences of the airflow A than the center pad 25 is. In addition, since each side pad 26 has the front stepped surface 26*b* at the leading side, the airflow A smoothly runs from the front stepped surfaces 26*b* and 26*b* to the second rear pneumatic bearing surfaces 26*a* and 26*a*, so that the second rear pneumatic bearing surfaces 26*a* and 26*a* are subjected to a highest positive pressure, meaning the generation of a large lift. The positive pressure applied to the second rear pneumatic bearing surfaces 26*a* and 26*a* is higher than the positive pressure applied to the front pneumatic bearing surface 21*a*.

Since the side surface 25*c* of the center pad 25 at the leading side has no steps, the side surface 25*c* of the center pad 25 at the leading side forms a steep wall surface, causing the airflow to move along the steep wall surface. As a result, the first rear pneumatic bearing surface 25*a* of the center pad 25 is less subjected to influences of the airflow, meaning that the first rear pneumatic bearing surface 25*a* is subjected to a smaller positive pressure.

The magnetic head lifts from the front or back surface of the magnetic disk 1 to read magnetic information from the magnetic disk 1 by the magnetic core 12 or to write magnetic information to the magnetic disk 1 while it is flying.

Figure 3:
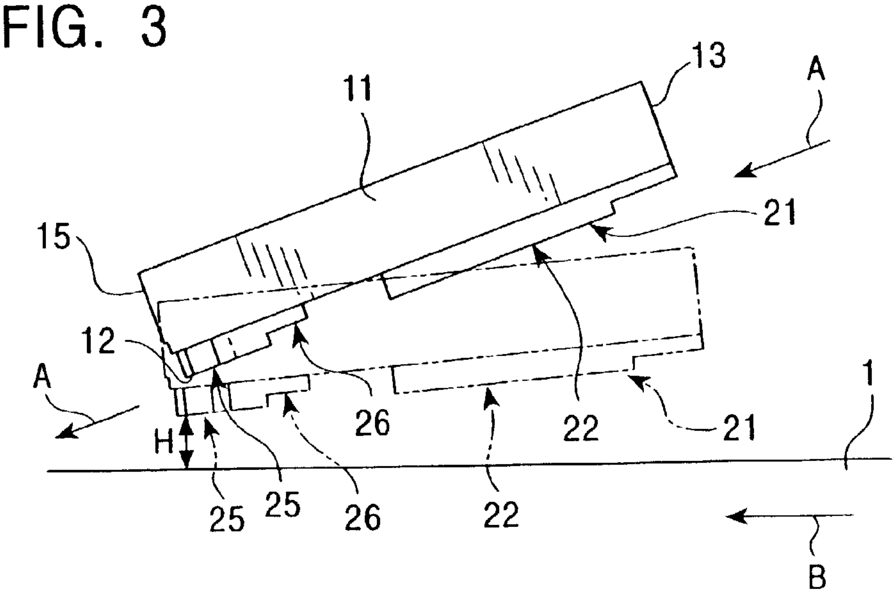
FIG. 3 is a side schematic diagram showing the magnetic head shown in FIG. 1 when the magnetic head is loaded and a state wherein air pressure has been dropped.

The magnetic head H1 in accordance with the embodiment has the structure wherein a highest positive pressure by the airflow A produced when the magnetic disks 1 rotates is applied to the vicinity of the side pads 26 and 26. With this arrangement, the side pads 26 and 26 are most subjected to the influences caused by changes in air pressure if the air pressure drops due to an external impact or load during a loading or seeking operation. As a result, the amount of lift diminishes, the side pads 26 and 26 being the support point, as illustrated in FIG. 3; therefore, the center pad 25 provided with the magnetic core 12 hardly shoulders the influences of changes in air pressure. This makes it possible to reduce the influences from changes in air pressure exerted on the spacing H between the magnetic core 12 and the magnetic disks, thus preventing the magnetic core 12 from touching the magnetic disks 1.

The magnetic recording apparatus J equipped with the magnetic heads H1 according to the embodiment permits the prevention of damage caused by the magnetic cores 12 provided on the magnetic heads H1 coming in contact with the magnetic disks 1. Moreover, even if an external impact or load should be applied, damage to the magnetic disks 1 by flying magnetic heads H1 can be prevented.

In this embodiment, the descriptions have been given of the case where the side surface of the center pad 25 at the leading side has no steps. Alternatively, however, the side surface of the center pad 25 may have a step. In this case, the stepped surface is preferably higher than the front stepped surfaces 26*b* of the side pads 26.

An example according to the present invention will now be described.

EXAMPLE

Figure 5:
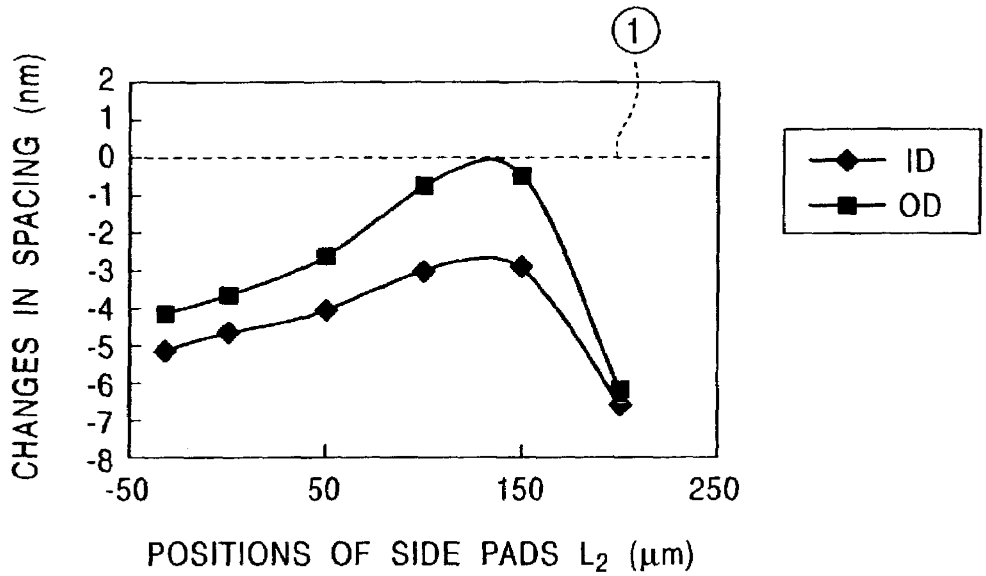
FIG. 5 is a diagram illustrating the relationship between the positions of side pads of the magnetic head according to the embodiment and changes in the spacing between a magnetic core and a magnetic disk when air pressure is dropped.

The magnetic head H1 shown in FIGS. 1 and 2 with the side pads 26 installed at different positions was mounted on the magnetic recording apparatus shown in FIG. 4, and the changes in the spacing H between the magnetic core and the magnetic disk caused by changes in air pressure were checked. The results are shown in FIG. 5. The slider body 11 was formed of $Al_2O_3$—TiC. The slider body 11 had a length $L_1$ of 1.241 mm, a width $W_1$ of 1 mm and a thickness of 0.3 mm. The side pads 26 were positioned such that a distance $L_3$ from the trailing side 15 of the center of the magnetic core 12 (the surface of the reading head on the leading side) provided on the center pad 25 was set to a constant value, 38 μm. The distance $L_2$ between the center of the magnetic core 12 and one of the side pads 26 was changed within the range of −38 μm to 200 μm. The air pressure in this case changed from the level of air pressure applied at the altitude of 0 feet (0 m) to the level of air pressure applied at the altitude of 10 K feet (3048 m). Referring to FIG. 5, the dotted line 1 denotes the spacing H obtained at the level of air pressure applied at the altitude of 0 feet (0 m). The amount of spacing at that time was defined as the reference value, 0 nm.

Figure 7:
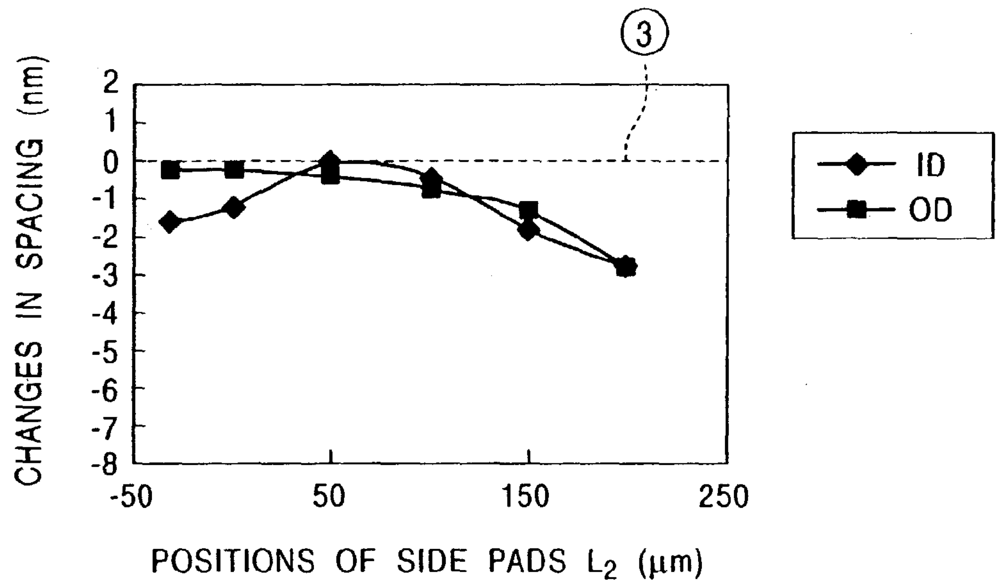
FIG. 7 is a diagram illustrating the relationship between the positions of the side pads of the magnetic head according to the embodiment and changes in the spacing between the magnetic core and the magnetic disk when the number of revolutions of the magnetic disk is decreased.

The magnetic head H1 shown in FIGS. 1 and 2 that has the side pads 26 located at different positions was mounted on the magnetic recording apparatus shown in FIG. 4, and the changes in the spacing H between the magnetic core and the magnetic disk caused by changes in the number of revolutions of the magnetic disk from 7200 rpm to 5400 rpm were checked. The results are shown in FIG. 7. Referring to FIG. 7, the dotted line 3 denotes the spacing H observed when the number of revolutions of the magnetic disk was 7200 rpm. The amount of spacing at that time was defined as the reference value, 0 nm.

Referring to FIGS. 5 and 7, the symbol "♦" indicates the values obtained when the magnetic head H1 was lifted right above the innermost periphery, or inner diameter (ID), of the magnetic disk 1, while the symbol "■" indicates the values obtained when the magnetic head H1 was lifted right above the outermost periphery, or outer diameter (OD), of the magnetic disk 1.

COMPARATIVE EXAMPLE

Figure 6:
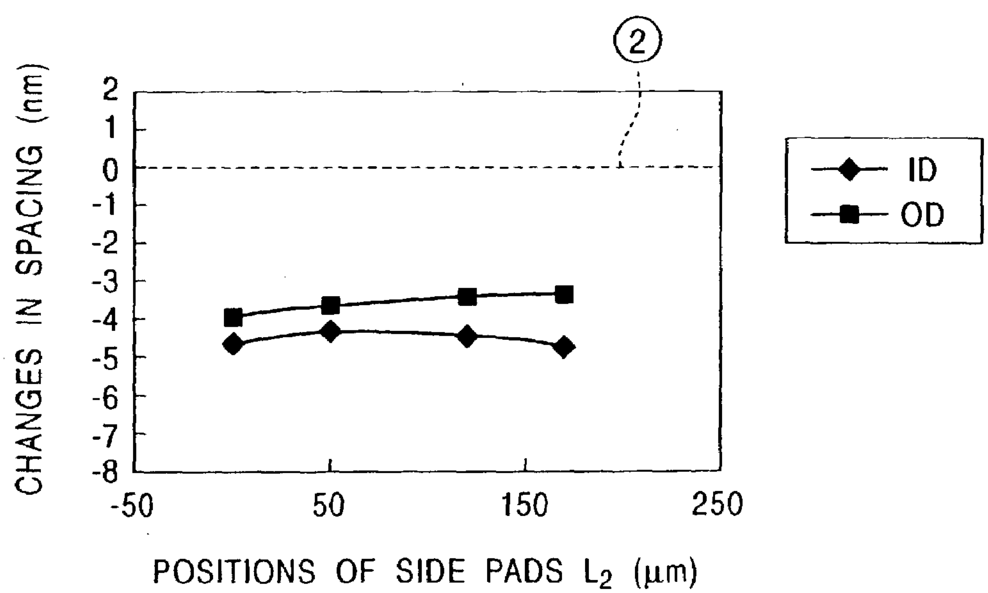
FIG. 6 is a diagram illustrating the relationship between the positions of side pads of a magnetic head according to a comparative example and changes in the spacing between a magnetic core and a magnetic disk when air pressure is dropped.
Figure 9:
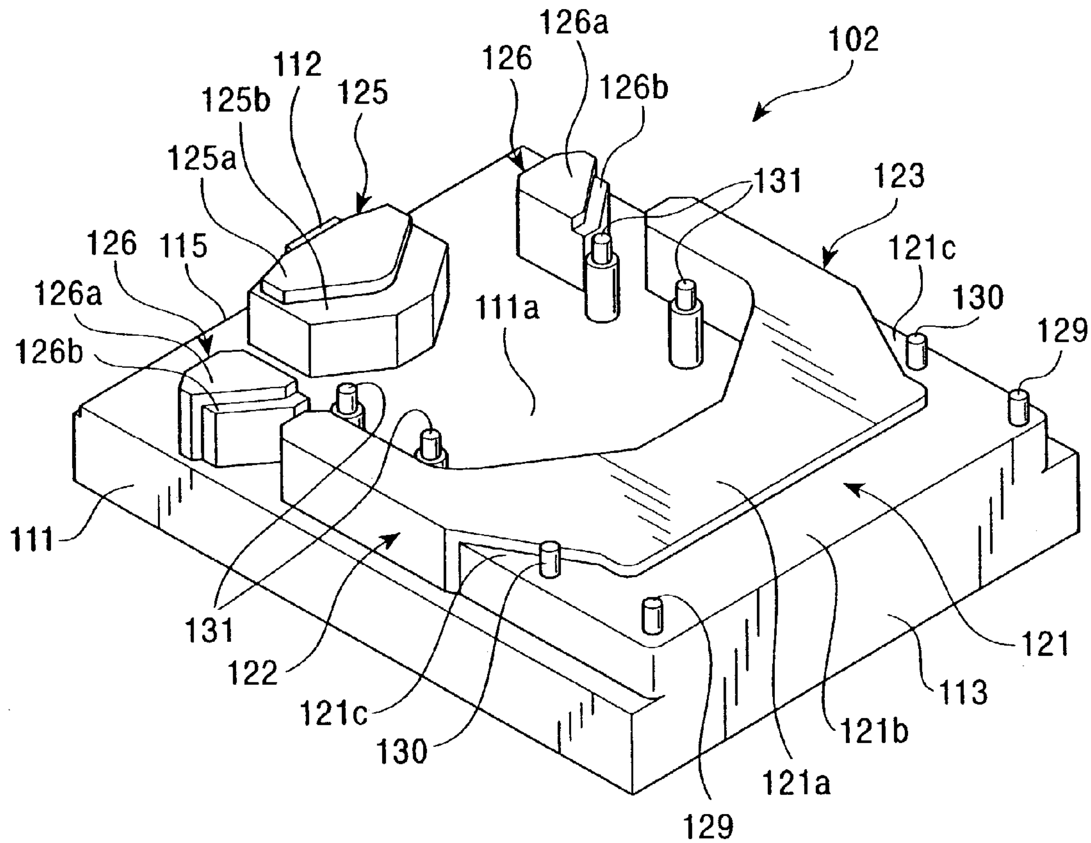
FIG. 9 is a perspective view showing a conventional magnetic head mounted on a magnetic recording apparatus.
Figure 10:
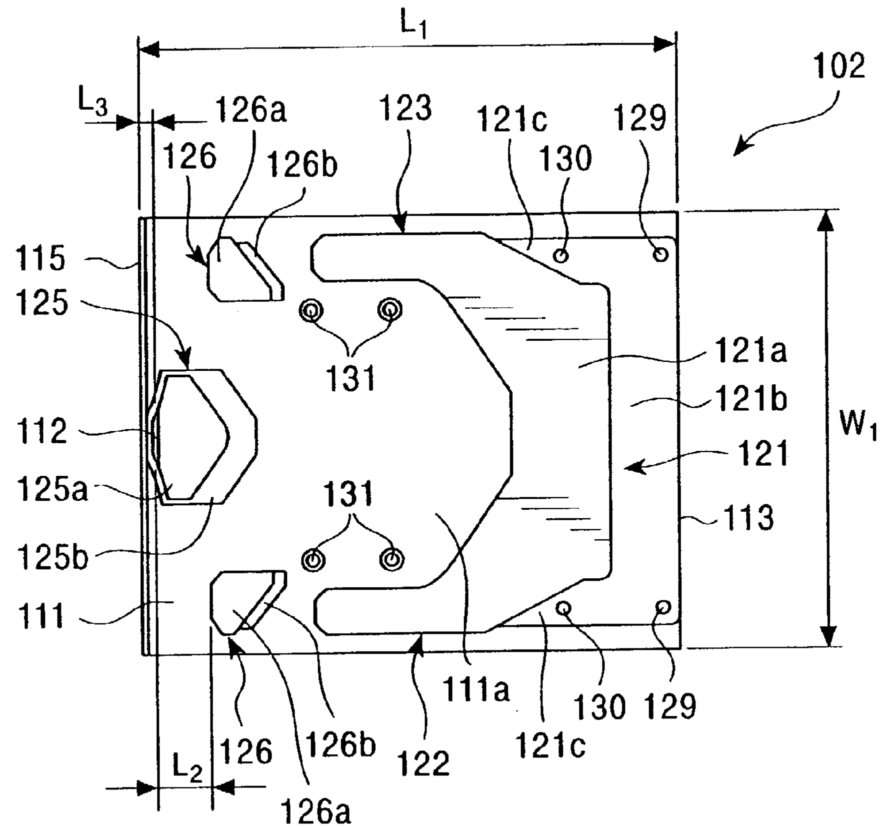
FIG. 10 is a plan view of the magnetic head shown in FIG. 9 observed from a recording medium opposing surface side.
Figure 11:
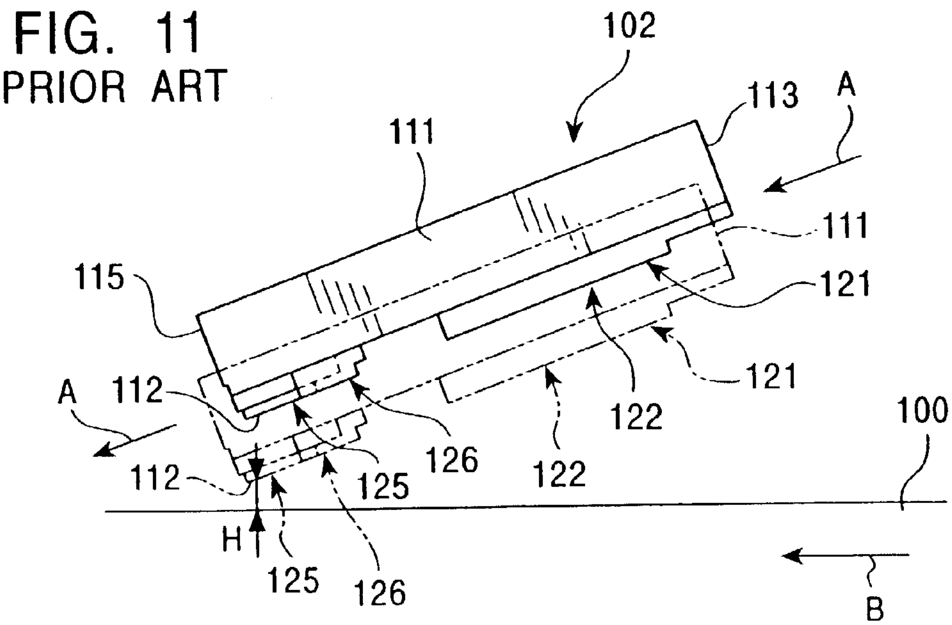
FIG. 11 is a side schematic diagram showing the magnetic head shown in FIG. 9 when the magnetic head is loaded and a state wherein air pressure is dropped.

The conventional magnetic head (comparative example) shown in FIGS. 9 and 10 with the side pads 126 installed at different positions was mounted on the magnetic recording apparatus shown in FIG. 4, and the changes in the spacing H between the magnetic core and the magnetic disk caused by changes in air pressure were checked in the same manner as that in the above example. The results are shown in FIG. 6. The slider body 111 was formed of $Al_2O_3$—TiC. The slider body 111 had the length $L_1$ of 1.241 mm, the width $W_1$ of 1 mm and the thickness of 0.3 mm. The side pads 126 were positioned such that the distance $L_3$ from the trailing side 115 of the center of the magnetic core 112 (the surface of the reading head on the leading side) provided on the center pad 125 was set to a constant value, 38 μm. The distance $L_2$ between the center of the magnetic core 112 and one of the side pads 126 was changed within the range of −0 μm to 200 μm. Referring to FIG. 6, the dotted line 2 denotes the spacing H obtained at the level of air pressure applied at the altitude of 0 K feet (0 m). The amount of spacing at that time was defined as the reference value, 0 nm.

Figure 8:
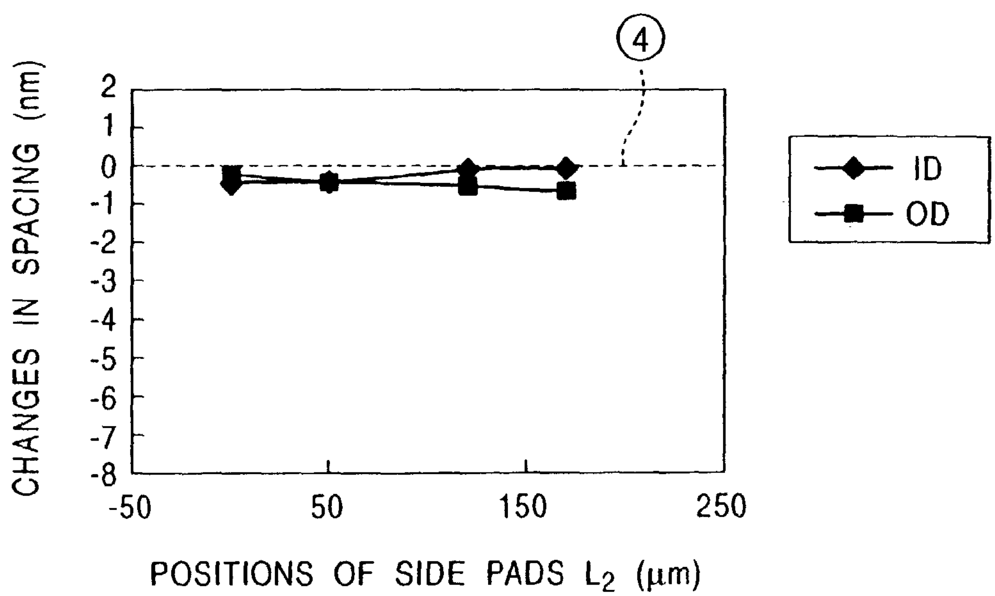
FIG. 8 is a diagram illustrating the relationship between the positions of side pads of a magnetic head according to a comparative example and changes in the spacing between a magnetic core and a magnetic disk when the number of revolutions of the magnetic disk is decreased.

The magnetic head 102 shown in FIGS. 9 and 10 that has the side pads 126 located at different positions was mounted on the magnetic recording apparatus shown in FIG. 4, and the changes in the spacing H between the magnetic core and the magnetic disk caused by changes in the number of revolutions of the magnetic disk from 7200 rpm to 5400 rpm were checked. The results are shown in FIG. 8. Referring to FIG. 8, the dotted line 4 denotes the spacing H observed when the number of revolutions of the magnetic disk was 7200 rpm. The amount of spacing at that time was defined as the reference value, 0 nm.

Referring to FIGS. 6 and 8, the symbol "♦" indicates the values obtained when the magnetic head 102 was lifted right above the innermost periphery of the magnetic disk 1, while the symbol "■" indicates the values obtained when the magnetic head 102 was lifted right above the outermost periphery of the magnetic disk 1.

From the results shown in FIGS. 5 and 6, it is seen that a drop in air pressure causes the spacing H to reduce 4 nm to 5 nm in the magnetic head of the comparative example in which the center pad is larger than the side pads. The same trend was observed when the distance $L_2$ of the side pads 126 was changed. Furthermore, the same trend was observed even when the position where the magnetic head 102 was lifted was changed.

In contrast to the comparative example, in the magnetic head according to the example wherein the center pad is smaller than the side pads, it is seen that a reduction in the spacing H caused by a drop in the air pressure is smaller than that in the comparative example as long as the distance $L_2$ of the side pads 26 lies within the range of 0 $\mu$m to 150 $\mu$m.

From the results shown in FIGS. 7 and 8, it is seen that, in the magnetic head of the comparative example in which the center pad is larger than the side pads, reductions in the number of revolutions of the magnetic disk caused the spacing H to reduce about 1 nm, and this same trend was observed even when the distance $L_2$ of the side pads 126 was changed. Furthermore, the same trend was observed even when the position where the magnetic head 102 was lifted was changed.

In contrast to the comparative example, in the magnetic head according to the example wherein the center pad is smaller than the side pads, it is seen that a reduction in the spacing H caused by a drop in the number of revolutions of the magnetic disk can be controlled to about 1 nm or less as long as the distance $L_2$ of the side pads 26 lies within the range of 50 $\mu$m to 150 $\mu$m. Thus, it is understood that, in the magnetic head according to the example, satisfying the condition expressed as $50\ \mu m \leqq L_2 \leqq 100\ \mu m$ makes it possible to minimize the influences exerted on the spacing between the magnetic core and a magnetic recording medium caused by changes in air pressure and also to minimize the influences exerted on the spacing between the magnetic core and the magnetic recording medium caused by changes in the number of revolutions of the magnetic recording medium.

What is claimed is:

1. A magnetic head comprising:

a magnetic head slider having a slider body that flies with one surface opposing a magnetic recording medium, the magnetic recording medium being rotatively driven;

a magnetic core for recording or reproducing magnetic information being provided on the magnetic recording medium opposing surface of the slider body;

a center pad, side pads, a center rail and side rails for levitating the slider body being provided on the recording medium opposing surface of the slider body; and an upstream side in the rotational direction of the magnetic recording medium being defined as a leading side in the slider body, while a downstream side in the rotational direction being defined as a trailing side in the slider body; and wherein the magnetic core is provided on the center pad, the center pad being formed at the center of an end portion on the trailing side of the recording medium opposing surface of the slider body, the side pads are formed at both ends in the width direction at the positions closer to the leading side of the slider body than the center pad is, a total value of the areas of the recording medium opposing surfaces of both side pads is larger than the area of the recording medium opposing surface of the center pad, and each of the side pads has, at least on the leading side of the slider body, a front stepped surface that is lower than the remaining portion of the side pad.

2. The magnetic head according to claim 1, wherein the center pad has no step in a side surface at least on the leading side of the slider body.

3. The magnetic head according to claim 1, wherein the area of the recording medium opposing surface of at least one of the two side pads is set to be larger than the area of the recording medium opposing surface of the center pad.

4. The magnetic head according to claim 1, wherein a longitudinal distance $L_2$, provided between the magnetic core provided in the center pad and the a side end of the side pads nearest the trailing side of the slider body, satisfies a condition expressed by $0\ \mu m < L_2 \leqq 150\ \mu m$.

5. The magnetic head according to claim 4, wherein the longitudinal distance $L_2$ preferably satisfies a condition expressed by $50\ \mu m \leqq L_2 \leqq 100\ \mu m$.

6. A magnetic recording apparatus comprising:

a magnetic head comprising:

a magnetic head slider having a slider body that flies with one surface opposing a magnetic recording medium, the magnetic recording medium being rotatively driven;

a magnetic core for recording or reproducing magnetic information being provided on the magnetic recording medium opposing surface of the slider body;

a center pad, side pads, a center rail and side rails for levitating the slider body being provided on the recording medium opposing surface of the slider body; and an upstream side in the rotational direction of the magnetic recording medium being defined as a leading side in the slider body, while a downstream side in the rotational direction being defined as a trailing side in the slider body;

wherein the magnetic core is provided on the center pad, the center pad being formed at the center of an end portion on the trailing side of the recording medium opposing surface of the slider body, the side pads are formed at both ends in the width direction at the positions closer to the leading side of the slider body than the center pad is, a total value of the areas of the recording medium opposing surfaces of both side pads is larger than a value of the area of the recording medium opposing surface of the center pad, and each of the side pads has, at least on the leading side of the slider body, a front stepped surface that is lower than the remaining portion of the side pad, a supporting device for moving the magnetic head in the radial direction of the magnetic recording medium; and a magnetic head retreating portion provided in an outer peripheral side or an inner peripheral side of the magnetic recording medium.

7. The magnetic recording apparatus according to claim 6 further comprising:

a chassis supporting a spindle motor, the spindle motor rotatively driving at least one magnetic recording medium;

a covering member, the covering member providing with the chassis a closed structure for the magnetic recording medium, and allowing air to move in and out of the closed structure through a filter.

* * * * *